United States Patent [19]
Volker et al.

[11] Patent Number: 5,971,542
[45] Date of Patent: Oct. 26, 1999

[54] MULTIFOCAL CONTACT LENS

[75] Inventors: Malchow Volker, Kiel; Eckhard Rothe; Klaus Grimmenstein, both of Schonkirchen, all of Germany

[73] Assignee: Carl-Zeiss-Stiftung, Germany

[21] Appl. No.: 09/054,776

[22] Filed: Apr. 3, 1998

[30] Foreign Application Priority Data

Jun. 25, 1997 [DE] Germany .......................... 197 26 918

[51] Int. Cl.⁶ .................................................. G02C 7/04
[52] U.S. Cl. .......................................................... 351/161
[58] Field of Search ........................ 351/160 R, 160 H, 351/161, 162

[56] References Cited

U.S. PATENT DOCUMENTS

| | | | |
|---|---|---|---|
| 3,684,357 | 8/1972 | Tsuetaki | 351/161 |
| 3,726,587 | 4/1973 | Kendall | 351/161 |
| 4,693,572 | 9/1987 | Tsuetaki et al. | 351/161 |
| 4,854,089 | 8/1989 | Morales | 51/284 R |
| 5,100,225 | 3/1992 | Rothe | 351/161 |
| 5,151,723 | 9/1992 | Tajiri | 351/161 |
| 5,500,695 | 3/1996 | Newman | 351/161 |

FOREIGN PATENT DOCUMENTS

| | | |
|---|---|---|
| 0 452 549 A1 | 10/1991 | European Pat. Off. . |
| 0 452 549 | 5/1993 | European Pat. Off. . |
| WO 94/12909 | 11/1992 | WIPO . |
| WO 97/16760 | 5/1997 | WIPO . |

*Primary Examiner*—Scott J. Sugarman

[57] ABSTRACT

A multifocal contact lens has a substantially spherical lens body that has a substantially convex outer surface, a substantially concave inner surface, and an optical central point, with a horizontal and a vertical axis that intersect in the optical central point. These axes are horizontal and vertical in the sense that the lens being worn on a human eye is in a usually upright position. The lens has a centrally arranged optical zone, a lens outer region, and an rim region, and at least two thickened regions arranged on the outer lens region, between the optical zone and the rim region and laterally of the vertical mid-axis, for setting a given orientation of the contact lens relative to the human eye. A prescribed near vision value, at least in a lower visual region, and a prescribed far vision value in an upper visual region are distributed on the surface of the lens body. The transition between the visual regions is smoothed, and each of the visual regions is individually corrected, at least for spherical aberration, independently of the other visual region.

15 Claims, 4 Drawing Sheets

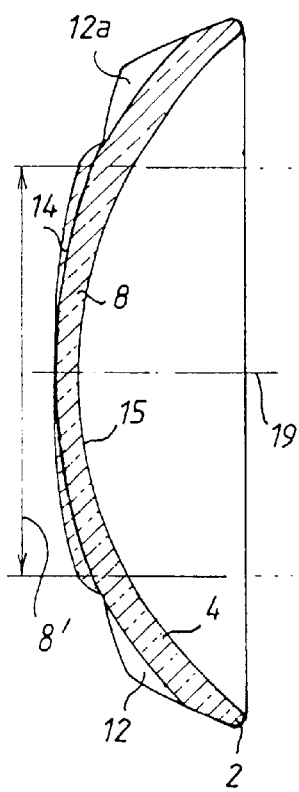
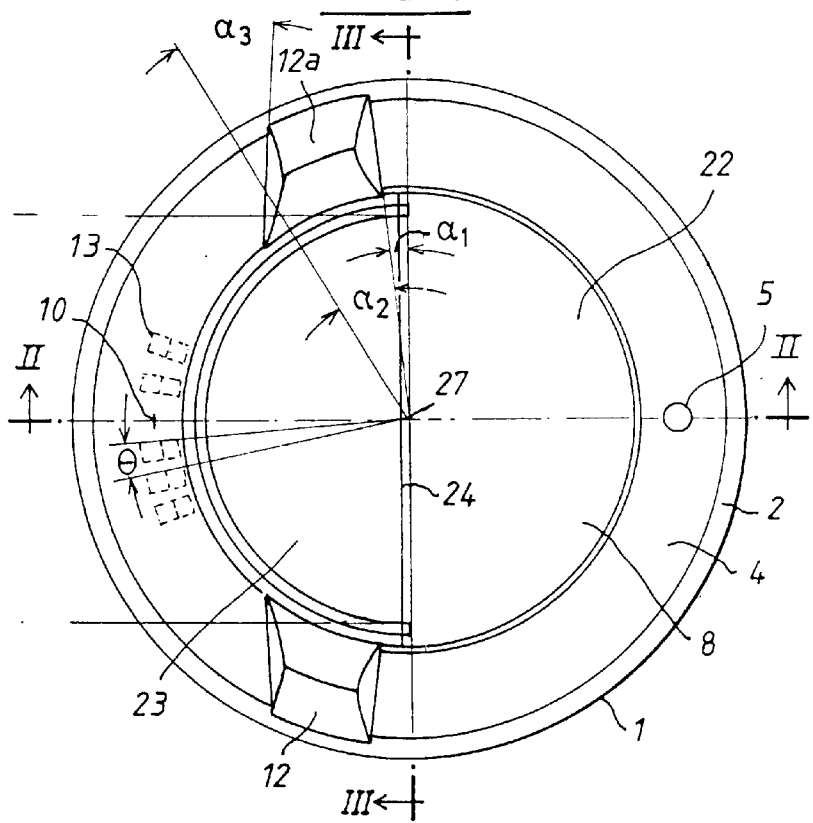
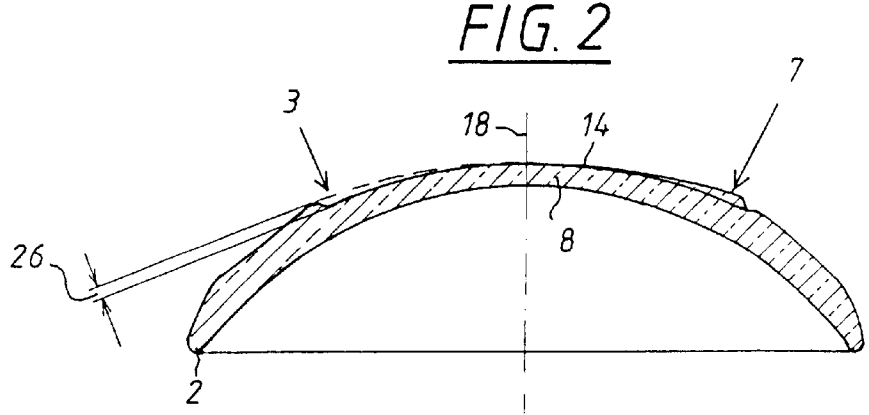

MULTIFOCAL CONTACT LENS

BACKGROUND OF THE INVENTION

1. Field of the Invention

This invention relates to a multifocal contact lens with a substantially spherical lens body, and more particularly to a lens body that has a substantially convex outer surface, a substantially concave inner surface, and an optical central point, with a horizontal and a vertical axis that intersect in the optical central point. These axes are horizontal and vertical in the sense that the lens being worn on a human eye is usually in an upright position. The lens has a centrally arranged optical zone, a lens outer region, and a rim region, and at least two thickened regions arranged outside the optical zone on the lens outer region between the optical zone and the rim region and laterally of the vertical mid-axis, for setting a given orientation of the contact lens relative to the human eye.

2. Discussion of Relevant Art

Contact lenses with position stabilization of the lens on the human eye serve, e.g., to correct dependent visual errors of the eye (e.g., astigmatism). The stabilization of the axial position of the contact lens serves to prevent rotational movement of the contact lens on the eye, and to ensure the orientation of the contact lens, even after a blink of the eyelid. Different stabilization principles are known in order to attain a position stabilization of a contact lens on an eye.

The different position stabilizations are in particular described in European Patent EP 0 452 549. The dynamic stabilization of contact lenses described there is particularly suitable for multifocal contact lenses. In multifocal contact lenses, a distinction is drawn between contact lenses with and without position stabilization. If it is desired to associate a far vision region and a near vision region definitively with different regions of the optical zone, this is possible in particular in the case of contact lenses with a position stabilization.

Advantageous embodiments of the optical zone are known, for example from U.S. Pat. No. 5,151,723 and U.S Pat. No. 4,693,572. The disadvantage of the optical zone described in these patents are severe thickness changes result at the lateral rims of the contact lens, and can lead to irritation of the upper eyelid. The stabilization principle used in U.S. Pat. No. 5,151,723 and U.S Pat. No. 4,693,572 is particularly disadvantageous.

SUMMARY OF THE INVENTION

The object of the present invention is to combine a secure position stabilization of a contact lens on the eye of a contact lens wearer with a multifocal design of the optical zone, such that the resulting multifocal contact lens can be worn on a human eye with the greatest possible freedom from irritation.

This object is achieved according to the present invention by a multifocal contact lens having a substantially spherical lens body with a substantially convex outer surface, a substantially concave inner surface and an optical central point, with a horizontal mid-axis and a vertical mid-axis that intersect in the optical central point. The horizontal and vertical mid-axes are horizontal and vertical in the sense that the lens is worn on a human eye in a usually upright position. The lens also has a centrally arranged optical zone, a lens outer region, a rim region, and at least two thickened regions arranged on the lens outer region between the optical zone and the rim region, laterally of the vertical mid-axis for setting a given orientation of the contact lens relative to the human eye. A prescribed near vision value, at least in a lower visual region of the lens, and a prescribed far vision value, at least in an upper visual region of the lens, are distributed over a surface of the lens body. The transition between the lower visual region and the upper visual region is smoothed and each of the lower visual region and the upper visual region is individually corrected at least for spherical aberration independently of another visual region.

According to the invention, a prescribed near vision value, at least in a lower visual region, and a prescribed far vision value in an upper region are distributed over the surface of the lens body. This is already the case, for example, for the contact lenses known from U.S. Pat. No. 5,151,723 and U.S Pat. No. 4,693,572. Here, however, the transition between the visual regions is smoothed out. In addition, each of the visual regions is individually corrected, at least for spherical aberration, independently of the other visual region.

Only with this combination of features according to the invention, which is not suggested by the state of the art, can the object of the invention be achieved. The smoothing of the transitions between the visual regions leads to a substantial reduction of the irritation of the eyelid, particularly at the rim of the optical zone where the different radii of the visual regions otherwise lead to a sharp jump in thickness. In addition, each of the visual regions is corrected at least for spherical aberration, which leads to better imaging by the contact lens on the fundus of the eye, and thus to a better visual impression.

The smoothing of the transition or transitions between the visual regions should advantageously take place free from sudden changes of the image, so that the resulting multifocal contact lens is at least similar to a graded vision lens.

It should be noted that the movement of the pupil relative to the contact lens at the transition from far to near vision is different on the two eyes of the contact lens wearer. Therefore, it is advantageous if the dividing line rises on the nasal side and thus the pupil passes through this dividing line at right angles. The fastest possible transition from pure far vision to pure near vision is thereby made possible.

Since far vision is preponderant in the normal case for contact lens wearers, the far vision region should be larger than the near vision region. In particular, the far vision region should be aimed at straight-ahead vision. In special cases, however, the near vision can also be preponderant (e.g., in the workplace). In this case, for straight-ahead vision, the near vision region should include the region around the central point.

Since, however, the far vision region is dominant for contact lens wearers in the normal case, the transition between the visual regions should be situated below the optical central point.

A particularly good correction for the eye to be corrected is obtained when the front surface of the lens is of an aspheric shape, the degree of asphericity in the near vision region being chosen to be different from the degree of asphericity in the far vision region. Each region is then optimally correctable to fulfill its function.

When the optical zone is given a substantially triangular shape, an optimally large optically usable zone is obtained.

In the present invention, the optical zone above the thickened regions should run at least as far as a circular line that passes through the theoretical highest crest line of the thickened regions.

The transition between the far and near vision regions is advantageously arranged in a range of ±3 mm around the horizontal mid-axis. This advantageous range was determined experimentally.

If is often also advantageous when the dividing line between near and far vision regions is curved, in order to ensure the perpendicular passage of the pupil through the transition from near to far vision.

It is also particularly advantageous to arrange the dividing line between the near and far vision regions to be oblique relative to the stabilization axis of the contact lens on the human eye.

The intersection point of the dividing line with the vertical axis perpendicular to the stabilization axis should be situated below the stabilization axis. This is particularly appropriate for lateral eye movements.

The diameter of the far vision region should be larger than the diameter of the near vision region, so that no disturbance of far vision results from lateral eye movement.

If the thickened regions of the lens lie respectively at a point on the lower eyelid when the eye is open, an optimum positional stability of the contact lens on the eye of the contact lens wearer is obtained.

The thickened regions should then be substantially arranged below the horizontal mid-axis.

DESCRIPTION OF THE DRAWINGS

Preferred embodiments of the invention will now be described, taken together with the drawings, in which:

FIG. 1 shows a top view of a contact lens according to the invention;

FIG. 2 shows a section view through the Section Lines II—II shown in FIG. 1;

FIG. 3 shows a section view through Section Lines III—III shown in FIG. 1;

DETAILED DESCRIPTION OF PREFERRED EMBODIMENTS

Figure 4:
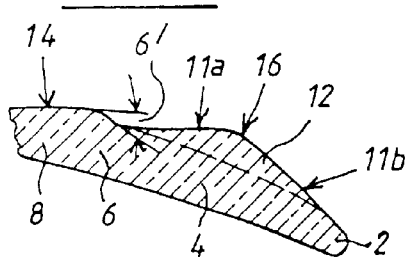
FIG. 4 shows a detailed section view of the lens outer region of the contact lens of FIG. 1.
Figure 5:
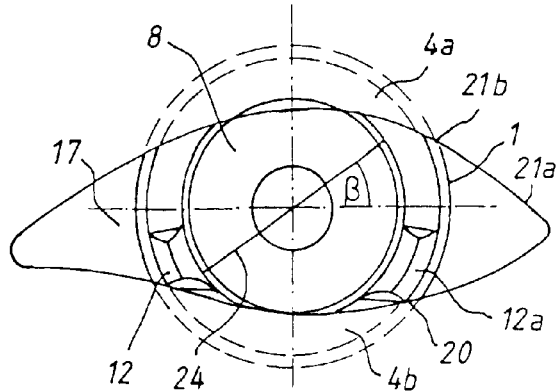
FIG. 5 shows the contact lens of FIG. 1, set on the eye of a contact lens wearer.

The contact lens (1) shown in FIGS. 1–6 uses the same stabilization principle as the contact lens of European Patent EP 0 452 549. In it, the two thickened regions (12, 12a) on its lower portion provide a support on the lower eyelid (21a) of the open eye (17) of the contact lens wearer, in at least one respective support point (20) (wherein a linear support is to be aimed for in fitting the contact lens to the eye), so that the position of the contact lens (1) on the eye (17) is very stable.

The upper eyelid (21b) provides by its movement for this light, at least pointwise support (20), to be again attained after a blink, after the contact lens (1) has slipped on the eye (17). Respective portions (4a, 4b) of the contact lens (1) are located under the upper eyelid (21b) and under the lower eyelid (21a) at all times, so that the contact lens (1) is securely held on the open eye (17). Irritation of the eyelids by the contact lens is thereby minimized.

According to the wearer's eyelid geometry, the angles ($\alpha 1$, $\alpha 2$, $\alpha 3$) can be individually fitted to establish the thickened regions (12, 12a). The angle $\alpha 1$ gives the position of the midpoint of the upper boundary line of the thickened region (12a) relative to the horizontal mid-axis (19). The angle $\alpha 2$ lies between the straight line connecting the central point (27) to the midpoint of the upper boundary line of the thickened region (12a) and the straight line connecting the central point (27) to the midpoint of the lower boundary line of the thickened region (12a) and thus establishes the size of the thickened region (12, 12a) on the lens outer region (4). The angle $\alpha 3$ again lies between the straight line connecting the central point (27) to the midpoint of the lower boundary line of the thickened region (12a) and this connecting straight line, and thus establishes the orientation of this connecting straight line. The position of the lower boundary line of the thickened region (12a) is important for the manner in which the thickened region (12a) of the contact lens (1) lies on the lower eyelid (21a). In many cases it is appropriate for the position of the upper boundary line of the thickened region (12a) to be established in order to optimize the angles at which the upper eyelid (21b) meets the boundary line of the thickened region. The angles concerned ($\alpha 1$, $\alpha 2$, $\alpha 3$) for a contact lens (1) can be different for the left-hand and right-hand thickened regions (12, 12a) laterally of the vertical mid-axis (18) and for the contact lens (1) for the left eye and the right eye (17) of the contact lens wearer.

The lens outer region (4) in the region of the thickened region (12) is shown, further enlarged, in FIG. 4. In dimensioning the thickened regions (12), care must be taken that the inner and outer boundary surfaces (11a, 11b) correspond in their inclinations, and thus also the resulting, rounded central elevation (16) of the thickened region (12), to the thickness of the optical zone (8) located there, to the extent that the thickness difference (6') in the transition zone (6) between the optical zone (8) and the thickened region (12) is not too great.

The contact lens (1) shown in FIGS. 1–6 consists substantially of a convex outer surface (lens front surface 14) and a concave inner surface (lens back surface 15). It has a centrally arranged optical zone (8) that is surrounded by a lens outer region (4). The outer termination forms the rim region (2) of the contact lens (1).

The thickened regions (12, 12a) are arranged, in the embodiment shown in FIGS. 1–6, on the lens outer region (4) below the horizontal mid-axis (18).

Furthermore, a colored spot (5) is arranged on the lens outer region (4) on the vertical axis (19) of the contact lens (1). This colored spot (5) assists in correctly setting the contact lens (1) on the human eye (17) of the contact lens wearer.

Further marks (10) and markings (13) are also arranged on the lens outer region (4), and are arranged such that the opthalmologist or optician can judge the position of a contact lens (1) placed on the eye (17) of a contact lens wearer. For this reason, the individual symbols (10, 13) have a set (equal or unequal) distance or angular distance (θ) from each other (with reference to the optical central point).

The optical zone (8) itself is divided into a far vision portion (22) and a near vision portion (23). In the preferred embodiment shown in FIG. 1, the dividing line (24) between the far vision portion (22) and the near vision portion (23) runs parallel to the horizontal mid-axis (19) beneath the optical central point (27). However, the dividing line (24) can also run at an angle β (see FIG. 5), as is shown in the additional preferred embodiments of the contact lens described hereinbelow. The angle β is situated between the straight lines connecting the ends of the dividing line (24) (i.e., in the transition region between the optical zone (8) and the lens outer region (4)), and the vertical mid-axis (19).

Figure 6:
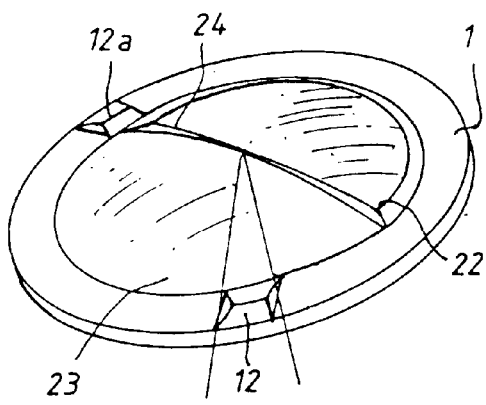
FIG. 6 shows an oblique side view of the contact lens of FIG. 1.

As can be clearly seen in FIG. 6, the upper and lower portions (22, 23) of the optical zone (8) have a different curvature on the lens front surface (14). (This different curvature of the far vision and near vision portions (22, 23) could also be located on the lens back surface (15)). Thus, different optical effects are attained in the near vision region (23) and far vision regions (22). Due to these different front surface radii, a jump is obtained, laterally of the vertical mid-axis (19), on transition from the far vision region (22) to the near vision region (23) and vice versa. The jump is greatest at the rim of the optical zone (8). This jump of the dividing line (24) is smoothed, so that a graded vision zone results around the dividing line (24) in a transition region, at least laterally of the horizontal mid-axis (19). However, this smoothing zone is not sensed as such by the brain of the contact lens wearer, because of the size of the pupil relative to this graded vision zone. This smoothing of the dividing line (24) is important for good tolerance of the contact lens (1) on the eye (17) of the contact lens wearer.

Finally, the different radii of the optical zone (8) on the lens outer surface (14) lead to different thicknesses (3, 7) of the contact lens (1) in the optical zone (8), where the total thickness difference (26) should not exceed a maximum of 0.1 mm. Consequently, the contact lens (1) has a smoothing of the optical zone (8) toward the lens outer region (4), in order to prevent irritations of the eyelids (21a, 21b).

Furthermore both the far vision region (22) and also the near vision region (23) are corrected for spherical aberration, so that both regions (22, 23) have good imaging properties.

The size of the optical zone (8) for the near vision region (23) and the far vision region (22) is different in the diameter (8'). The diameter of the two regions (22, 23) to be selected must be determined individually for each eye (17).

Figure 7:
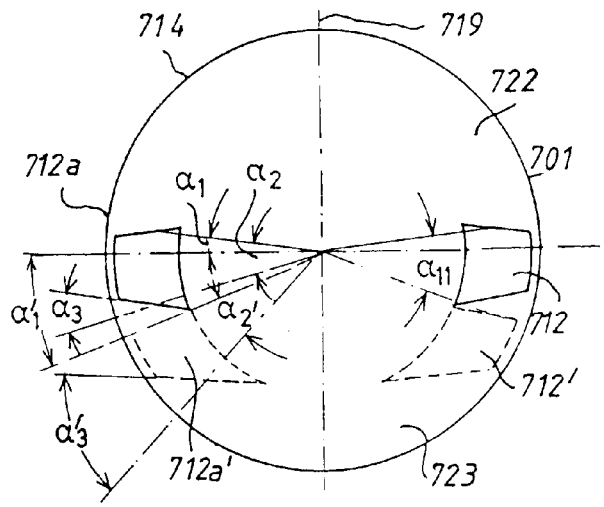
FIG. 7 is a sketch of the principle of the positioning of the thickened regions on the lens outer region in a contact lens according to FIG. 1.

The different possibilities of positioning the thickened regions (712, 712a, 712', 712a') on the front surface of the contact lens (701) are shown in FIG. 7. The thickened regions (712, 712a, 712', 712a') can also be distributed on the front lens surface (714) so that several respective thickened regions (712, 712'; 712a, 712a') are arranged laterally of the vertical mid-axis, and their respective shape (defined by the angle $_{an}$) can be different, respectively.

Different regions of the optical surface are shown in FIGS. 8–13.

Figure 8:
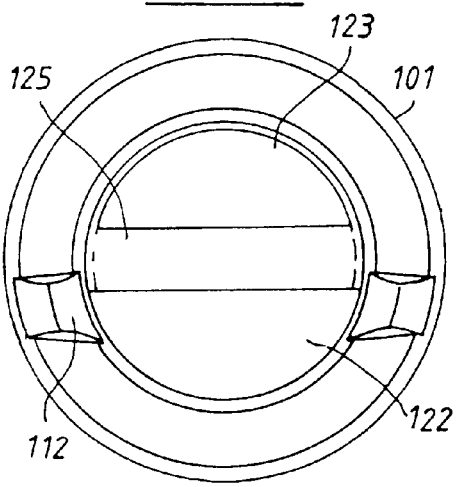
FIG. 8 is a second embodiment of the configuration of the optical zone of the contact lens according to the invention.

In FIG. 8, a transition zone (125) is arranged in the optical zone, between the far vision region (122) and the near vision region (123). This transition zone (125) provides for a sliding transition between the near vision region (123) and the far vision region (122). The far vision region (122) is arranged below the near vision region (123) in this embodiment.

Figure 9:
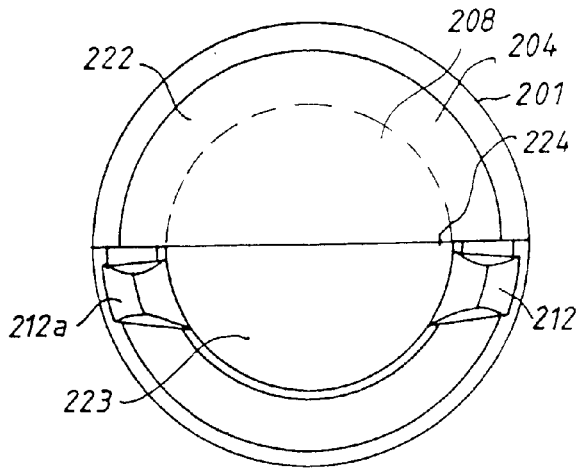
FIG. 9 is a third embodiment of the configuration of the optical zone of the contact lens according to the invention.

In the embodiment shown in FIG. 9, the far vision region (223) need not be restricted to the optical zone (208), but can also extend, at least partially, if not completely, to the lens outer region (204). This is particularly possible in the upper half of the contact lens (201). This results in a very large, optically usable, upper half of the contact lens (201), which can be used for the near vision region or the far vision region. The dividing line (224) between the two regions (222, 223) also extends into the lens outer region (204). In the lower part of the contact lens (201), the stabilizing elements (212, 212a) prevent an enlargement of the optical zone used (208), since the possible optical zone (208) can hardly be used beneath the stabilizing elements (212, 212a).

Figure 10:
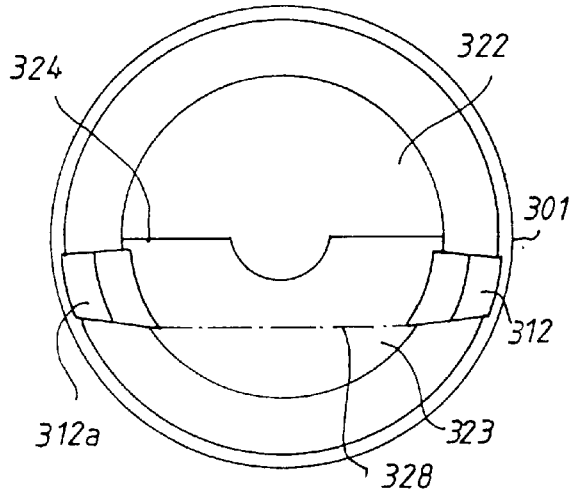
FIG. 10 is a fourth embodiment of the configuration of the optical zone of the contact lens according to the invention.

In FIG. 10, the dividing line (324) between the far vision region (322) and the near vision region (323) is partially curved downward in the middle, in order to make undistorted far vision possible through the contact lens (301) in the rest position of the eye. This curvature of the dividing line (324) should, however, end above the line (328) that joins the middle points of the lower boundary lines of the thickened regions (312, 312a).

Figure 11:
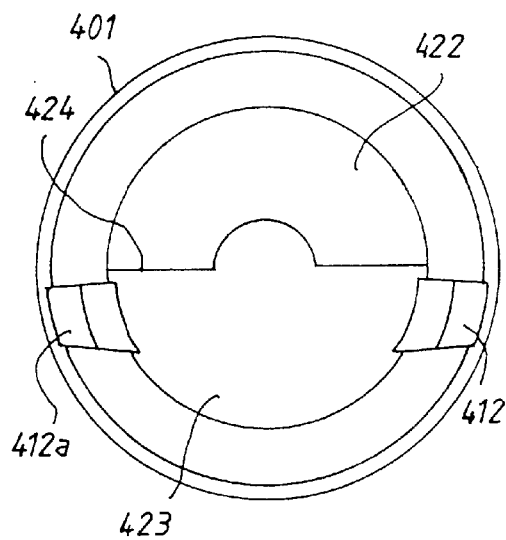
FIG. 11 is a fifth embodiment of the configuration of the optical zone of the contact lens according to the invention.

To the contrary, in the embodiment shown in FIG. 11, the contact lens (401) makes unhindered near vision possible in the resting position of the eye. Therefore, the dividing line (424) is curved upward in this embodiment.

Figure 12:
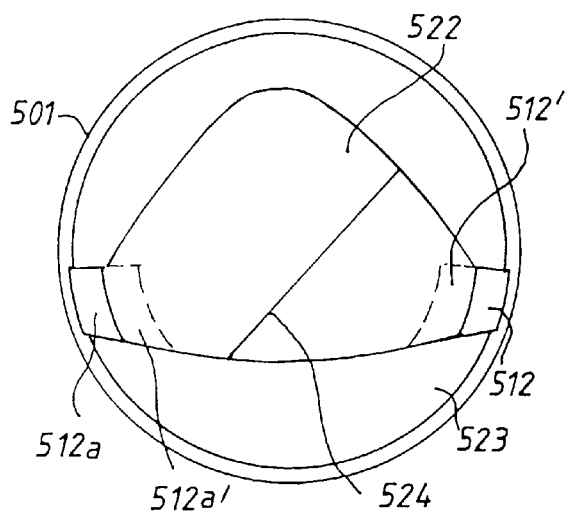
FIG. 12 is a sixth embodiment of the configuration of the optical zone of the contact lens according to the invention.

In the embodiment shown in FIG. 12, the far vision region (522) of the contact lens (501) has a substantially rectangular shape. The contact lens (501) is to be worn on the right eye of the contact lens wearer, with the dividing line (524) rising nasally, for both the left and the right eye. The near vision region (523) is arranged in the nasal direction, and the far vision region (522) is arranged in the temple region. In this embodiment, a portion of the thickened regions (512', 512a') lies in the optical zone.

Figure 13:
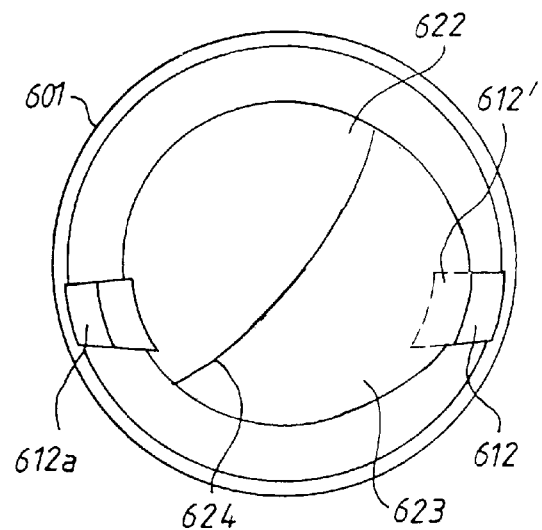
FIG. 13 is a seventh embodiment of the configuration of the optical zone of the contact lens according to the invention.

In the embodiment shown in FIG. 13, a contact lens (601) with a round optical zone is shown. The near vision region (623) is arranged nasally here, and is divided from the far vision region (622) by the curved dividing line (624). in this embodiment, a portion of a thickened region (612') also lies in the optical zone.

Figure 14:
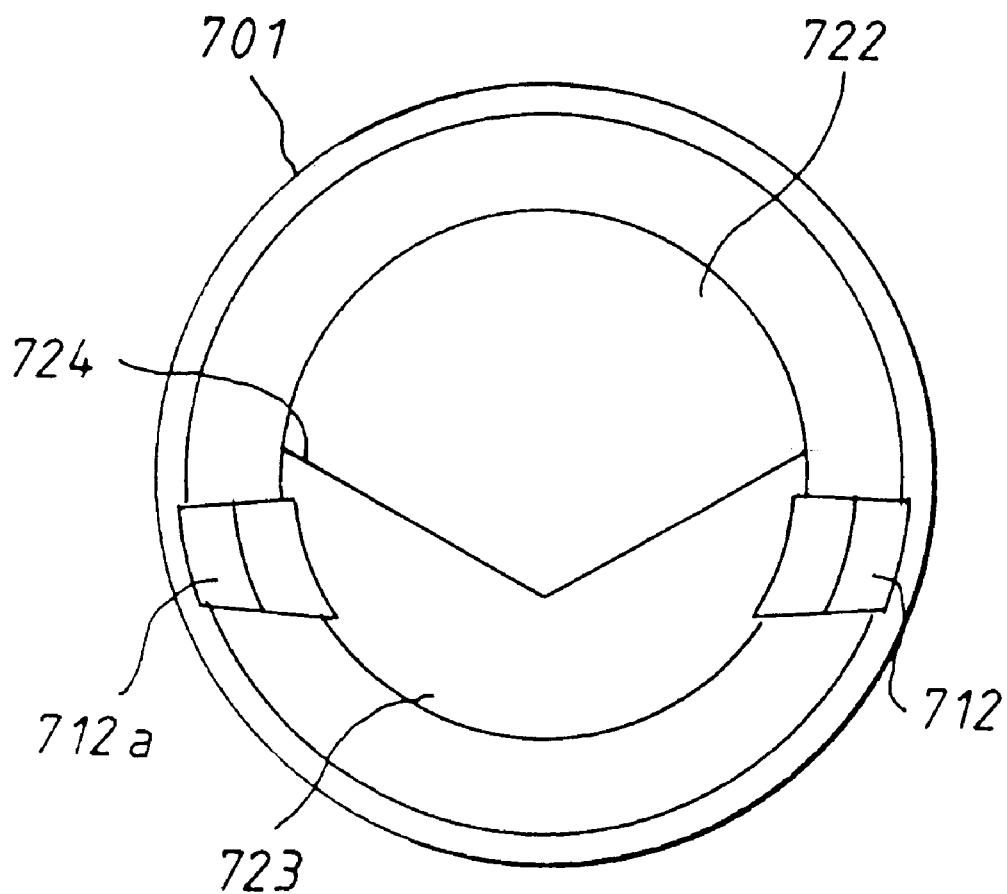
FIG. 14 is an eighth embodiment of the configuration of the optical zone of the contact lens according to the invention.

In order to ensure undistorted vision and to be able to use the same contact lens for both eyes, the dividing line may also be formed in a V-shape. This embodiment is shown in FIG. 14. The contact lens (701) shown in FIG. 14 has a round optical zone that is divided by the V-shaped dividing line (724) into a near vision region (723) and a far vision region (722). These thickened regions (712, 712a) are situated completely outside the optical zone.

In the contact lenses shown in FIGS. 1, 5, 8, 9, 10, 11, 12, 13 and 14, the optical zone can extend into the lens outer zone, to the extent that this is desired and is considered appropriate.

What is claimed is:

1. A multifocal contact lens having a substantially spherical lens body comprising a substantially convex outer surface, a substantially concave inner surface, and an optical central point, with a horizontal mid-axis and a vertical mid-axis that intersect in said optical central point, said axes being horizontal and vertical in the sense that said lens is worn on a human eye in a usually upright position, said lens further comprising a centrally arranged optical zone, a lens outer region, a rim region, and at least two thickened regions arranged on said lens outer region between said optical zone and said rim region and laterally of said vertical mid-axis for setting a given orientation of said contact lens relative to the human eye, wherein a prescribed near vision value, at least in a lower visual region, and a prescribed far vision value, at least in an upper visual region, are distributed over a surface of said lens body, a transition between said lower visual region and said upper visual region is smoothed, and each of said lower visual region and said upper visual region is individually corrected, at least for spherical aberration, independently of another visual region.

2. The multifocal contact lens according to claim 1, wherein said transition between said lower visual region and said upper visual region is shaped so as to be free from sudden image changes.

3. The multifocal contact lens according to claim 1, wherein a dividing line between said lower visual region and said upper visual region rises in a nasal direction.

4. The multifocal contact lens according to claim 1, wherein said far vision region is larger than said near vision region.

5. The multifocal contact lens according to claim 1, wherein said transition between said lower visual region and said upper visual region is situated below said optical central point.

6. The multifocal contact lens according to one of claim 1, wherein said outer surface (14) is aspherically shaped with a degree of asphericity in said near vision region (23) that is different from the degree of asphericity in said far vision region (22).

7. The multifocal contact lens according to one of claim 1 wherein said optical zone (8) has a substantially triangular shape.

8. The multifocal contact lens according to claim 1, wherein said optical zone (8) above said thickened regions (12) runs at least to a circular line that passes through a theoretically highest crest line of said thickened regions (12).

9. The multifocal contact lens according to claim 1, wherein said transition between said near vision region (23) and said far vision region (22) is situated in a region ±3 mm around said horizontal mid-axis (18).

10. The multifocal contact lens according to claim 1, wherein a dividing line (24) between said near vision region (23) and said far vision region (22) is curved.

11. The multifocal contact lens according to claim 1, wherein a dividing line (24) between said near vision region (23) and said far vision region (22) is arranged obliquely relative to a stabilization axis of said contact lens on the eye.

12. The multifocal contact lens according to claim 1, wherein said vertical mid-axis is perpendicular to a stabilization axis of said contact lens, and an intersection point of a dividing line between said near vision region (23) and said far vision region (22) is below said stabilization axis.

13. The multifocal contact lens according to claim 1, wherein the diameter of said far vision region (22) is larger than the diameter of said near vision region (23).

14. The multifocal contact lens according to one of claim 1 wherein said thickened regions are arranged to rest on a lower eyelid of the open eye, at least at one point, respectively.

15. The multifocal contact lens according to one of claim 1, wherein said thickened regions are arranged substantially below said horizontal mid-axis.

* * * * *